US007025082B1

(12) United States Patent
Wood

(10) Patent No.: US 7,025,082 B1
(45) Date of Patent: Apr. 11, 2006

(54) ON-BOARD REFUELING SYSTEM FOR VEHICLES

(76) Inventor: Bruce Wood, P.O. Box 490, Gladstone, OR (US) 97027

( * ) Notice: Subject to any disclaimer, the term of this patent is extended or adjusted under 35 U.S.C. 154(b) by 0 days.

(21) Appl. No.: 11/028,063

(22) Filed: Jan. 4, 2005

(51) Int. Cl.
*B67D 5/04* (2006.01)
*F17D 1/04* (2006.01)

(52) U.S. Cl. ................ 137/351; 137/565.01; 137/572; 123/198 C; 141/382

(58) Field of Classification Search ................ 137/351, 137/565.01, 571, 572, 899; 123/198 R, 198 C, 123/468, 469; 141/382
See application file for complete search history.

(56) References Cited

U.S. PATENT DOCUMENTS

| | | | | |
|---|---|---|---|---|
| 2,650,747 | A * | 9/1953 | Rinne | 141/42 |
| 2,996,077 | A * | 8/1961 | Taggert | 137/537 |
| 3,170,495 | A * | 2/1965 | Wagner | 137/572 |
| 3,272,241 | A * | 9/1966 | Wagner | 141/388 |
| 3,774,654 | A * | 11/1973 | Hjermstad | 141/382 |
| 4,064,901 | A * | 12/1977 | Bailey | 137/351 |
| 4,747,429 | A * | 5/1988 | Sundstrom, Jr. | 137/351 |
| 4,978,282 | A | 12/1990 | Fu et al. | 417/360 |
| 5,122,039 | A | 6/1992 | Tuckey | 417/366 |
| 5,135,258 | A | 8/1992 | Buxton | 180/839 |
| 5,154,213 | A * | 10/1992 | Malamas et al. | 141/382 |
| 5,425,625 | A | 6/1995 | Hsu | 417/277 |
| 5,603,304 | A | 2/1997 | Matczak | 123/509 |
| 5,718,260 | A * | 2/1998 | Leonardi | 137/572 |
| 5,913,294 | A * | 6/1999 | Takahashi et al. | 137/571 |
| 6,056,028 | A * | 5/2000 | Crawford | 141/382 |
| 6,070,769 | A | 6/2000 | Hornsby | 222/529 |
| 6,158,975 | A | 12/2000 | Dill et al. | 417/307 |
| 6,167,903 | B1 * | 1/2001 | Newman | 137/351 |
| 6,357,424 | B1 | 3/2002 | Sonoda et al. | 123/509 |
| 6,371,159 | B1 * | 4/2002 | Timberlake | 137/572 |
| 6,663,350 | B1 | 12/2003 | Tyree, Jr. | 417/53 |
| 6,712,590 | B1 | 3/2004 | Villela et al. | 417/423.9 |
| 2003/0183180 | A1 | 10/2003 | Wada | 123/2 |
| 2004/0060547 | A1 | 4/2004 | Aubree et al. | 123/497 |
| 2004/0079343 | A1 | 4/2004 | Stenz et al. | 123/509 |

FOREIGN PATENT DOCUMENTS

JP 57-191173 11/1982

* cited by examiner

*Primary Examiner*—John Rivell
(74) *Attorney, Agent, or Firm*—Richard C. Litman

(57) ABSTRACT

An on-board refueling system for vehicles. The refueling system includes a coil reel and a fuel pump. The coil reel has a forward end and a rearward end, a handle proximate the forward end, and a nozzle attached to the forward end. The nozzle is configured to engage a siphon hose. The fuel pump is configured to be interconnected between the rearward end of the coil reel and a fuel tank through a tee connector. A handle is attached proximate the forward end of the coil reel. The nozzle can be configured with a one way valve to prevent fuel from draining when the coil reel is not in use. A coil box can be provided for the coil reel. An on/off valve, such as a petcock valve, is interconnected between the connector tee and a carburetor. An on/off switch can be interconnected to the fuel pump to enable remote operation of the fuel pump.

14 Claims, 5 Drawing Sheets

ON-BOARD REFUELING SYSTEM FOR VEHICLES

BACKGROUND OF THE INVENTION

1. Field of the Invention

The present invention generally relates to refueling systems and, more particularly to an on-board refueling system for vehicles such as off-road vehicles or the like.

2. Description of Related Art

Off-road vehicle activity has increased markedly over the past several years and has resulted in the use of off-road vehicles such as all terrain vehicles (ATVs) for a number of leisure and work related activities. ATVs provide great mobility and traction and, because of their relatively small size, are widely used on a variety of surfaces, such as sand dunes, back roads, mountain trails, dirt paths, etc. However, refueling such off-road vehicles has typically involved carrying heavy gas cans that result in inevitable spillage of fuel during conventional refueling processes. A need exists for an on-board refueling system for vehicles that facilitates the siphoning of fuel from a gas can for delivery to the fuel tank of a vehicle.

SUMMARY OF THE INVENTION

The present invention is an on-board refueling system. The refueling system includes a coil reel and a fuel pump. The coil reel has a forward end and a rearward end, a handle proximate the forward end, and a nozzle attached to the forward end. The nozzle is configured to engage a siphon hose. The fuel pump is configured to be interconnected between the rearward end of the coil reel and a fuel tank through a tee connector. A handle is attached proximate the forward end of the coil reel. The nozzle can be configured with a one way valve to prevent fuel from draining when the coil reel is not in use. A coil box can be provided for the coil reel. An on/off petcock valve or other type of on/off valve is interconnected between the connector tee and a carburetor. An on/off switch can be interconnected to the fuel pump to enable remote operation of the fuel pump. The fuel pump can be a low pressure fuel pump, such as having a size of about two inches by three inches, and being configured to operate at about three pounds per square inch, and around forty-five gallons per hour.

The refueling system can be provided in combination with a fuel tank, where the fuel pump is interconnected between the rearward end of the coil reel and the fuel tank. The refueling system can be provided in combination with a siphon hose mounted in a gas can. The siphon hose can have a debris cap to prevent debris from entering into the gas tank.

A refueling method can include interconnecting a fuel pump between a reward end of a coil reel and a fuel tank, grasping a handle of the coil reel and pulling the coil reel, engaging a nozzle of the coil reel to a siphon hose in a gas can, and setting an on/off valve, such as a petcock valve or the like, in an off position to prevent fuel from reaching a carburetor and to cause fuel go up into a fuel tank via the fuel pump. The refueling method can set the on/off valve in the on position to cause fuel to reach the carburetor. The coil reel is disengaged from the siphon hose, and is recoiled back into the coil box.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
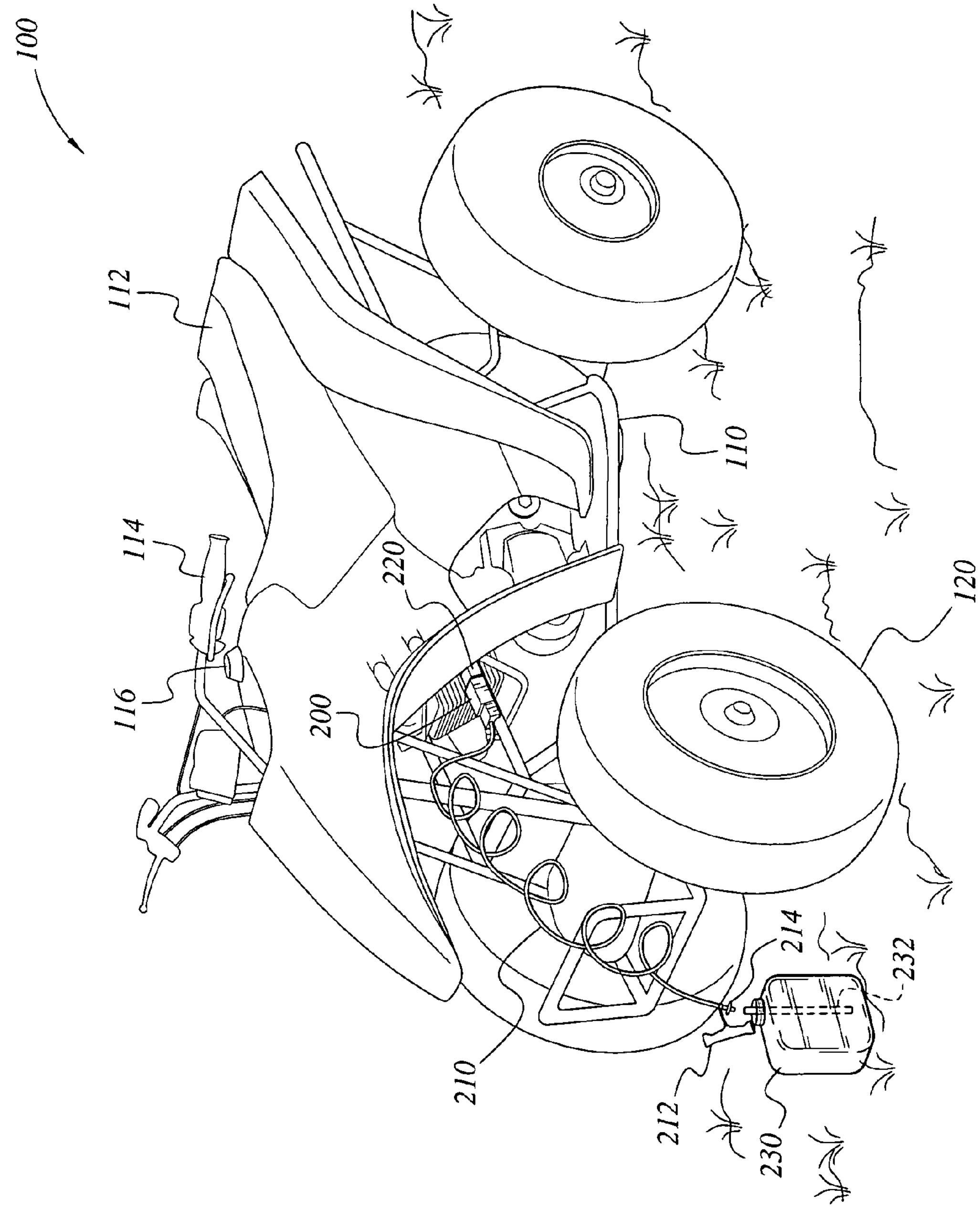
FIG. 1 is a side perspective view of an ATV vehicle equipped with an on-board refueling system according to the present invention.

The present invention is an on-board refueling system for vehicles. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 2:
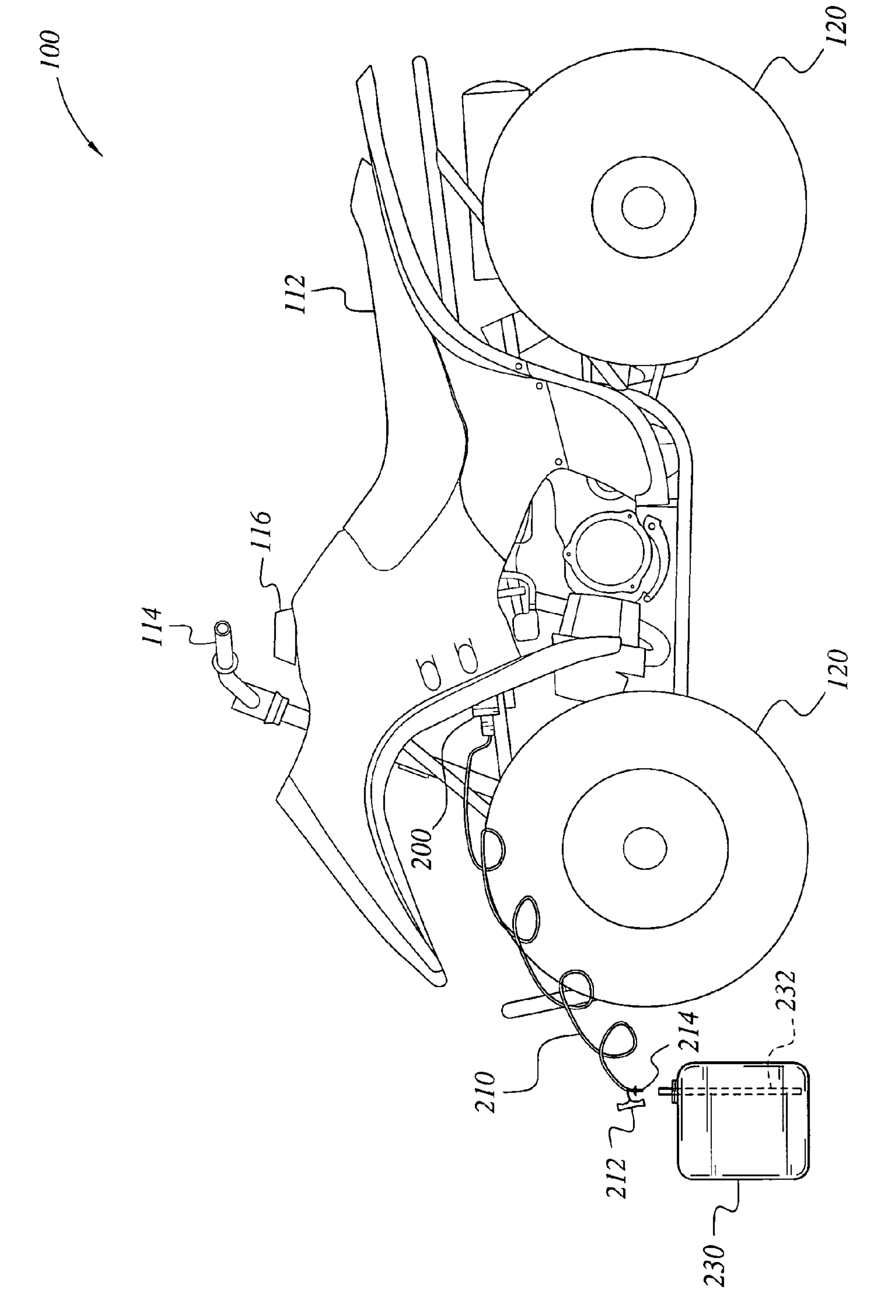
FIG. 2 is a side view of the ATV vehicle shown in FIG. 1.
Figure 3:
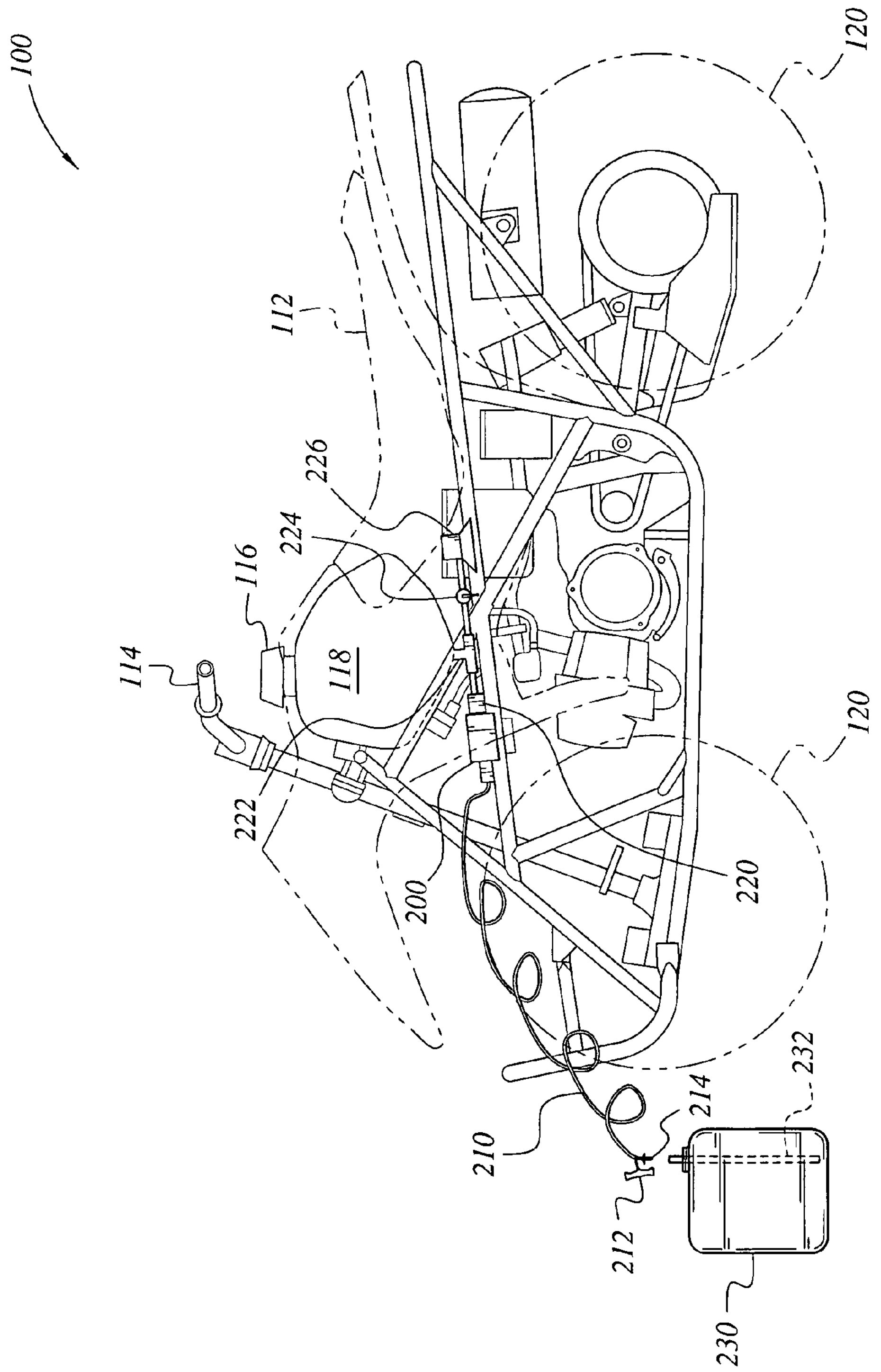
FIG. 3 is a cross-sectional side view of the ATV vehicle shown in FIG. 1.
Figure 4:
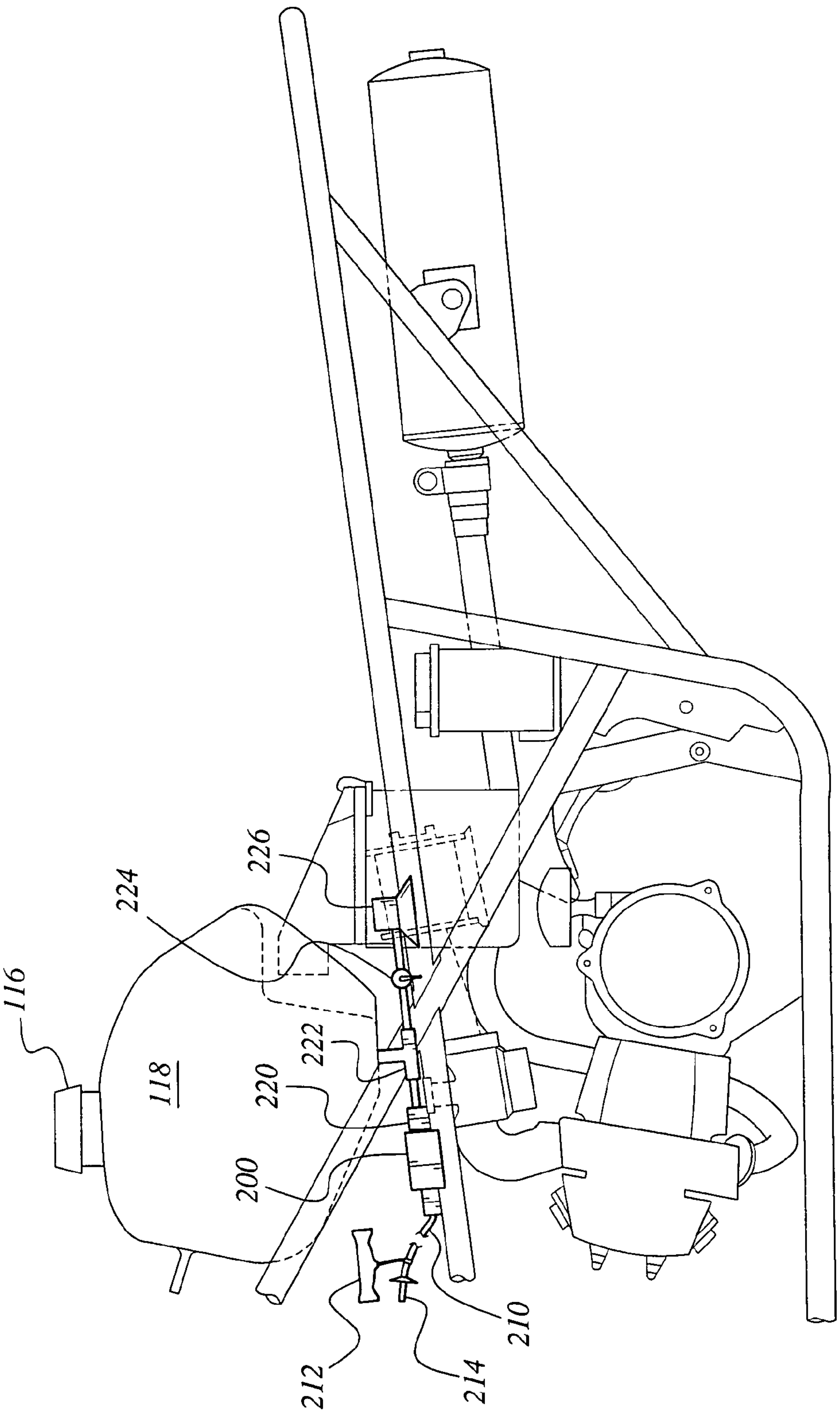
FIG. 4 is a cross-sectional view of the fuel tank
Figure 5:
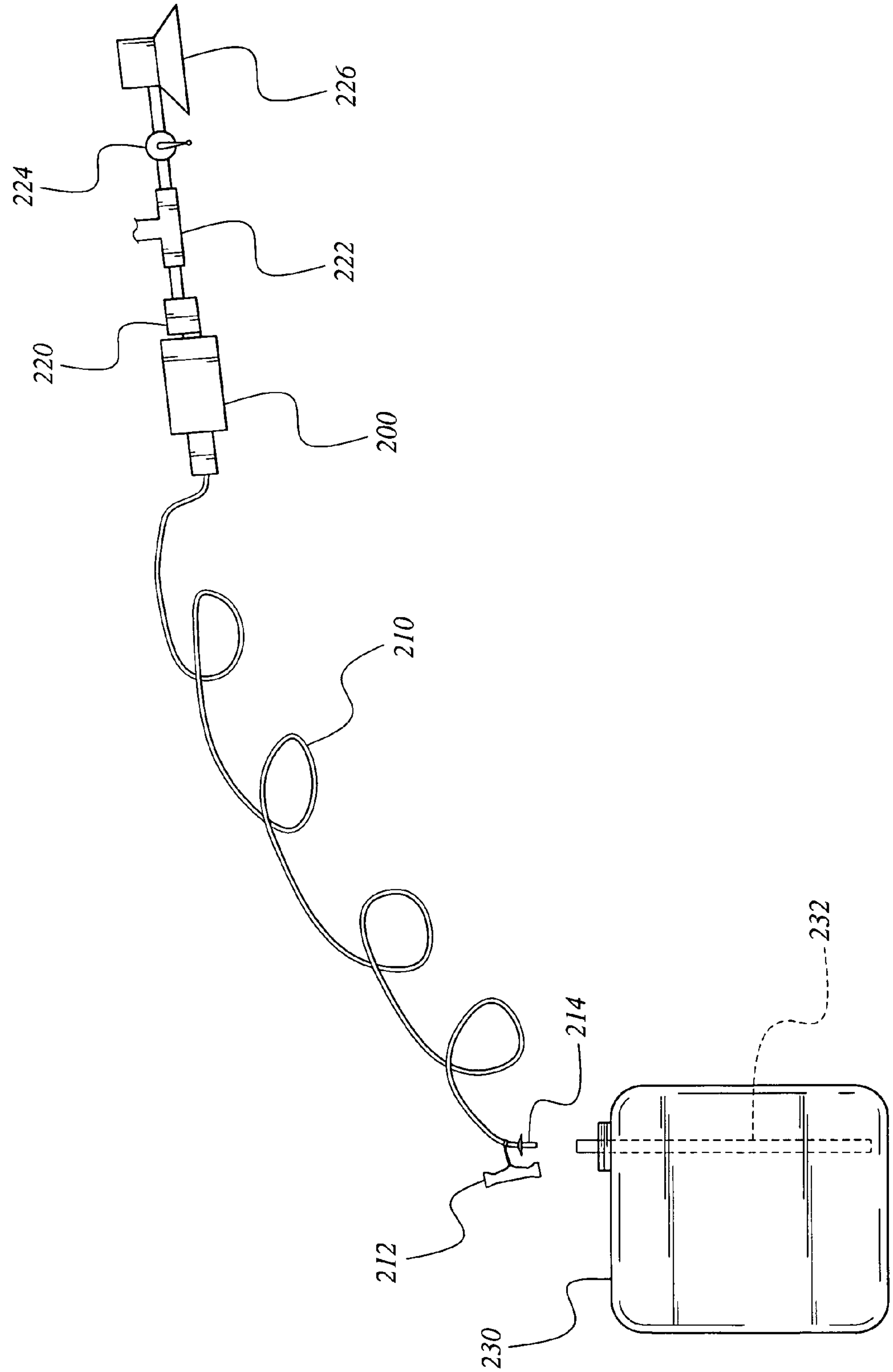
FIG. 5 is a side view of the on-board system shown in FIGS. 1–4.

Referring to the drawings, FIGS. 1–4 illustrate an off-road vehicle in the form of an ATV 100 equipped with an on-board refueling system according to the present invention. However, the on-board refueling system can be utilized with any variety of vehicle including motorcycles, jet skis, snow mobiles, dune buggies, lawn tractors, etc. The ATV 100 has a vehicular frame 110. Left and right side surfaces of the upper portion of the vehicular frame 110 are covered with side covers. Front upper portion of front wheels 120. A seat 112 is interconnected with the front fenders. Rear fenders spread out left and right from the side covers to the upper portion of rear wheels 120. A steering column extends from between the front wheels. Bar-handles extend from the steering column and are covered by handle covers 114.

An internal combustion engine is mounted on the vehicular frame 110 below the seat 112. A fuel tank 118 is mounted above the engine. Fuel from the fuel tank 118 is supplied to the engine by gravity through a carburetor 226. The fuel tank 118 can be conventionally filled from the top by removing a fuel cap 116. However, the ATV 100 is equipped with an on-board refueling system which allows for refueling the fuel tank 118 through the bottom of the fuel tank 118.

The on-board refueling system includes a coil box 200 for a coil reel 210. The coil reel 210 can be configured as any type of coil reel, such as a five-eighths inch coil reel or the like. A handle 212 is attached proximate the forward end of the coil reel 210. A nozzle 214 is attached at the forward end of the coil reel 210. The nozzle 210 is preferably configured with a one way valve to prevent fuel from draining when the coil reel 210 is not in use.

The coil reel 210 is interconnected to a fuel pump 220 which is interconnected to the bottom of the fuel tank 118 through a tee connector 222. An on/off petcock valve 224 or other type of on/off valve is interconnected between the connector tee 222 and the carburetor 226. The on/off petcock valve 224 allows, when set in the on position, or prevents, when set in the off position, fuel to pass therethrough and reach the carburetor 226. The fuel pump 220 is powered by a power source, such as the battery of the ATV 100. An on/off switch can be provided on the handlebars of the ATV 100 to enable an operator to activate the fuel pump 220 by using the on/off switch. The fuel pump 220 is preferably a small low pressure unit. For example, the fuel pump could have a size of about two inches by three inches, and operate at about three pounds per square inch, and around forty-five gallons per hour. Other desired configurations could obviously be utilized. The nozzle 214 of the coil reel 210 is configured to engage a siphon hose 232 mounted within a gas can 230. A debris cap can be provided to the siphon hose to prevent debris from entering into the gas tank 230.

The operation of the on-board refueling system is the operator dismounts the ATV 100 and grasps the handle 212 of the coil reel 210 to pull the coil reel out of the coil box 200. The operator then engages the nozzle 212 of the coil reel 210 to the siphon hose 232. The operator then sets the on/off petcock valve 226 in the off position to prevent fuel from reaching the carburetor 226, and to cause fuel go up into the fuel tank 118 via the fuel pump 220. When the operator decides to discontinue fueling the fuel tank from the gas can 230 via the on-board refueling system, the operator sets the on/off petcock valve 224 in the on position to cause fuel to reach the carburetor 226. The coil reel 210 is disengaged from the siphon hose 232, and then recoils back into the coil box 200.

In summary, the present invention is an on-board refueling system. The refueling system includes a coil reel and a fuel pump. The coil reel has a forward end and a rearward end, a handle proximate the forward end, and a nozzle attached to the forward end. The nozzle is configured to engage a siphon hose. The fuel pump is configured to be interconnected between the rearward end of the coil reel and a fuel tank through a tee connector. A handle is attached proximate the forward end of the coil reel. The nozzle can be configured with a one way valve to valve or other type of on/off valve is interconnected between the connector tee and a carburetor. An on/off switch can be interconnected to the fuel pump to enable remote operation of the fuel pump. The fuel pump can be a low pressure fuel pump, such as having a size of about two inches by three inches, and being configured to operate at about three pounds per square inch, and around forty-five gallons per hour.

The refueling system can be provided in combination with a fuel tank, where the fuel pump is interconnected between the rearward end of the coil reel and the fuel tank. The refueling system can be provided in combination with a siphon hose mounted in a gas can. The siphon hose can have a debris cap to prevent debris from entering into the gas tank.

A refueling method can include interconnecting a fuel pump between a reward end of a coil reel and a fuel tank, grasping a handle of the coil reel and pulling the coil reel, engaging a nozzle of the coil reel to a siphon hose in a gas can, and setting an on/off valve, such as a petcock valve or the like, in an off position to prevent fuel from reaching a carburetor and to cause fuel go up into a fuel tank via the fuel pump. The refueling method can set the on/off valve in the on position to cause fuel to reach the carburetor. The coil reel is disengaged from the siphon hose, and is recoiled back into the coil box.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

The invention claimed is:

1. A refueling system comprising:

a coil reel with a forward end and a rearward end, a handle proximate the forward end, a nozzle attached to the forward end, the nozzle being configured to engage a siphon hose;

a fuel pump;

a tee connector;

said fuel pump interconnected between the rearward end of the coil reel and a fuel tank through said tee connector; and an on/off valve interconnected between the tee connector and a carburetor, wherein the on/off valve allows, when set in an on position, or prevents, when set in an off position, fuel to pass therethrough and reach the carburetor.

2. The refueling system according to claim 1, further comprising a handle attached proximate the forward end of the coil reel.

3. The refueling system according to claim 1, wherein the nozzle is configured with a one way valve to prevent fuel from draining when the coil reel is not in use.

4. The refueling system according to claim 1, further comprising a coil box for the coil reel.

5. The refueling system according to claim 1, wherein the on/off valve is a petcock valve.

6. The refueling system according to claim 1, further comprising an on/off switch interconnected to said fuel pump to enable remote operation of the fuel pump.

7. The refueling system according to claim 1, wherein said fuel pump is a low pressure fuel pump.

8. The refueling system according to claim 1, wherein said fuel pump has a size of about two inches by three inches, and is configured to operate at about three pounds per square inch, and around forty-five gallons per hour.

9. The refueling system according to claim 1, in combination with siphon hose mounted in a gas can.

10. The refueling system according to claim 9, wherein the siphon hose has a debris cap to prevent debris from entering into the gas tank.

11. A refueling method comprising:

interconnecting a fuel pump between a reward end of a coil reel and a fuel tank;

grasping a handle of the coil reel and pulling the coil reel;

engaging a nozzle of the coil reel to a siphon hose in a gas can; and setting an on/off valve in an off position to prevent fuel from reaching a carburetor and to cause fuel go up into the fuel tank via the fuel pump.

12. The refueling method according to claim 11, wherein the step of setting an on/off valve in an off position further comprises setting an on/off petcock valve in an off position to prevent fuel from reaching a carburetor and to cause fuel go up into the fuel tank via the fuel pump.

13. The refueling method according to claim 11, further comprising:

setting the on/off valve in an on position to cause fuel to pass therethrough and reach the carburetor;

disengaging the coil reel from the siphon hose; and recoiling the coil reel back into a coil box.

14. The refueling method according to claim 13, wherein the step of setting the on/off valve in an on position further comprises setting an on/off petcock valve in an on position to cause fuel to pass therethrough and reach the carburetor.

* * * * *